United States Patent
Bakanov et al.

(10) Patent No.: US 10,451,029 B2
(45) Date of Patent: Oct. 22, 2019

(54) DUAL ROTOR WIND POWER ASSEMBLY (VARIANTS)

(71) Applicants: Anatoly Georgievich Bakanov, Voronech (RU); Elena L'vovna Tikhonova, Voronezh (RU)

(72) Inventors: Anatoly Georgievich Bakanov, Voronech (RU); Elena L'vovna Tikhonova, Voronezh (RU)

(*) Notice: Subject to any disclaimer, the term of this patent is extended or adjusted under 35 U.S.C. 154(b) by 451 days.

(21) Appl. No.: 15/326,535

(22) PCT Filed: Aug. 7, 2014

(86) PCT No.: PCT/RU2014/000579
§ 371 (c)(1),
(2) Date: Jan. 16, 2017

(87) PCT Pub. No.: WO2016/010450
PCT Pub. Date: Jan. 21, 2016

(65) Prior Publication Data
US 2017/0198678 A1   Jul. 13, 2017

(30) Foreign Application Priority Data
Jul. 16, 2014   (RU) ................................ 2014129095

(51) Int. Cl.
*F03D 1/02*     (2006.01)
*F03D 7/02*     (2006.01)
(Continued)

(52) U.S. Cl.
CPC .......... *F03D 1/025* (2013.01); *F03D 7/0204* (2013.01); *F03D 7/0224* (2013.01); *F03D 9/255* (2017.02);
(Continued)

(58) Field of Classification Search
CPC ...... F03D 1/025; F03D 7/0204; F03D 7/0224; Y02E 10/723; Y02E 10/725; Y02P 70/523
See application file for complete search history.

(56) References Cited

U.S. PATENT DOCUMENTS

| | | | |
|---|---|---|---|
| 8,264,096 B2* | 9/2012 | Micu | F03D 15/00 290/55 |
| 8,742,608 B2* | 6/2014 | Micu | F03D 1/02 290/44 |

(Continued)

FOREIGN PATENT DOCUMENTS

| | | | | |
|---|---|---|---|---|
| RU | 1815408 A1 * | 5/1993 | | F03D 1/02 |
| RU | 2463475 C2 * | 10/2012 | | F03D 1/02 |

*Primary Examiner* — Hieu T Vo
*Assistant Examiner* — Arnold Castro
(74) *Attorney, Agent, or Firm* — Nadya Reingand; Yan Hankin (57) ABSTRACT

The invention relates to propeller-type horizontal-axis wind turbine assemblies. All of the present assembly variants comprise, mounted on a tower, a wind turbine with two coaxial wind propellers on a rotating platform, a gearbox, systems for controlling the pitch angles of the blades and the position of the platform, and an electric generator. The design of the assemblies additionally includes improvements which make it possible to increase the efficiency with which the energy of the wind is utilized, increase electricity output, reduce service time, simplify manufacture and use, increase reliability and working life, and eliminate infrasound.

6 Claims, 9 Drawing Sheets

(51) Int. Cl.

| | | |
|---|---|---|
| *F03D 9/25* | (2016.01) | |
| *F03D 15/00* | (2016.01) | |
| *F03D 80/70* | (2016.01) | |
| *F03D 80/80* | (2016.01) | |
| *F03D 15/10* | (2016.01) | |
| *F16H 1/28* | (2006.01) | |
| *F16H 37/04* | (2006.01) | |

(52) U.S. Cl.
CPC ............ *F03D 15/00* (2016.05); *F03D 80/70* (2016.05); *F03D 80/88* (2016.05); *F03D 15/10* (2016.05); *F05B 2260/40311* (2013.01); *F16H 1/28* (2013.01); *F16H 37/041* (2013.01); *Y02E 10/723* (2013.01); *Y02E 10/725* (2013.01); *Y02P 70/523* (2015.11)

(56) References Cited

U.S. PATENT DOCUMENTS

| | | | |
|---|---|---|---|
| 9,267,863 B2* | 2/2016 | Huhnd | G01M 9/04 |
| 2006/0093482 A1* | 5/2006 | Wacinski | F03D 1/025 |
| | | | 416/128 |
| 2010/0133838 A1* | 6/2010 | Borgen | F03D 1/06 |
| | | | 290/52 |
| 2011/0038726 A1* | 2/2011 | Elkin | F03D 1/025 |
| | | | 416/1 |
| 2014/0322013 A1* | 10/2014 | Elkin | F03D 7/041 |
| | | | 416/131 |
| 2015/0219068 A1* | 8/2015 | Port | F03D 7/0224 |
| | | | 290/39 |
| 2016/0017865 A1* | 1/2016 | Illing | F03D 7/0224 |
| | | | 416/1 |
| 2016/0208772 A1* | 7/2016 | Dermitzakis | F03D 7/02 |

* cited by examiner

DUAL ROTOR WIND POWER ASSEMBLY (VARIANTS)

CROSS-REFERENCE TO RELATED APPLICATIONS

The present patent application is a national stage application in USA of PCT application PC/RU2014/000579 filed on Aug. 7, 2014 claiming priority to Russian patent application RU 2014129095 filed Jul. 16, 2014, all of which incorporated herein by reference.

FIELD OF INVENTION

The invention relates to a propeller type wind turbine installations with horizontal axis.

BACKGROUND

Existing powerful wind turbines have a turbine with three blades and a rotor. Each blade is attached to the hub via the large diameter roll bearing. This design does not allow to increase the number of blades in the rotor. Turbine having more than three blades in the bush does not run. The three-blade turbines have low efficiency of wind power, which is about 26%.

Figure 1:
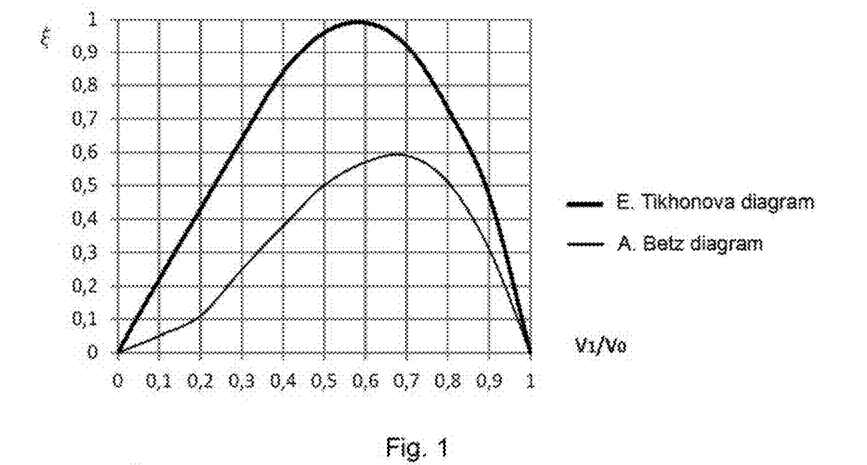
FIG. 1 shows the theoretical curves of wind energy efficiency of an ideal wind turbine.

There are several reasons for the decline of efficiency. The main reason is that there is a preconceived assumption that Wind Turbine Power depends weakly on the number of blades and depends only on the swept area of the blades. When designing the turbine curve the Betz diagram is used and his postulate of the theoretical maximum ratio of wind energy which is equal to 0.59:2:6. FIG. 1 shows the theoretical curves of wind energy efficiency of an ideal wind turbine: $\xi$—wind energy efficiency: $V_1$, $V_0$—wind (air) flow rate through the wind turbine and at the turbine inlet. A. Betz in his dissertation considered changing the air flow kinetic energy in the profiled air channel with conditional walls. He did not take into account the mass-energy exchange with ambient air turbine air flow. The reduced efficiency of a rotor three-blade turbine still occurs due to the fact that the rotating air stream appears after the rotor which reduces the value of an air pressure drop in the rotor thus reducing the turbine output power.

A small number of blades leads to emergence of low-frequency air pressure pulsations. The pulsation frequency is in the zone of dangerous infrasound 0÷12, Hz. Pulsations in the single rotor turbine arise at moments of a blade passing past the tower.

Typically a human ear perceives pulsation within the range of 16-20000 Hz. Its unpleasant consequences does not only cause an excessive noise in the audible pulsation range but generate the unperceivable infrasound in the human hearing within the range from 16 Hz to 0.001 Hz. Infrasound causes nervous stress, malaise, dizziness, changes in the internal organs, especially in the nervous and cardiovascular systems. The most dangerous is the infrasound range from 6 to 9 Hz. Significant psychotropic effects are manifested most strongly at the frequency of 7 Hz which is consonant with the alpha rhythm of the natural oscillations of the brain. Any mental work in this case is impossible. The sound of low intensity causes nausea and ringing in the ears, blurred vision and irrational fear. Medium intensity infrasound causes the frustration of digestive organs and the brain giving birth to a paralysis, general weakness, and sometimes a blindness.

Pressure pulsation and therefore the speed deviation result in some loss of turbine power due to the reducing cyclic pressure differential across the turbine wheel. The loss of power could be as high as 2-5% of its theoretical value. The experimental results published by the Massachusetts University show that the significant part of the sound energy is in the audio frequency range from 0 to 20 Hz, as shown in Example 3. Therefore, from both the economic and environment protection viewpoints it is advisable to eliminate the infrasound.

Conventional technical solutions for the elimination of the cause of the low-frequency oscillations at the wind turbines (wind power installations) are increasing the number of blades or an increasing the rotation speed of the wind wheel.

The double-rotor turbine rotors generally rotate in opposite directions. Their pressure pulsation frequency is higher than that of a single rotor turbine. The infrasound does not depend on the influence of the tower does. However, the pressure pulsations occur from the influence of the blades of one rotor on the blades of the other one. The freely selectable number of blades in the rotors can lead to an effect of acoustic beat. Therefore, the number of rotor blades Should not obey to the same multiplication factors. For example: one row of blades has four blades, the second row has two blades. Their total multiplier is 2. Similarly, one rotor has six blades and the other one has three. Their total multiplier is 3. In both cases the infrasound in the 4-6 Hz frequency range shall be generated.

The acoustic beat phenomenon can be eliminated if the number of blades in one rotor is equal to Z, and in the other is (Z+1).

The wind turbine is known according to the patent application [JP 2005036749 A 10 Feb. 2005], where:

Claim 1. The horizontal axis turbine rotor with variable speed and rotatable in azimuth, depending on the wind speed. The wind turbine provided with the means for measuring and recording the azimuth angle, rotation speed and the noise measurement system for recording time and frequency.

Claim 2. Wind turbine according to claim 1, with rotor speed controls.

Claim 3. Wind turbine according to claim 1, where the speed control is performed at the particular moment of time.

Claim 4. Wind turbine according to claim 1, where the controller device controls the azimuth angle of the rotor speed depending on the low-frequency noise.

Claim 5. Wind turbine according to claim 1, where the speed control is performed in the specific area at the turbine leeward or windward side.

Claim 6. Wind turbine according to claim 1, where the rotation speed is reduced at the particular time in the particular area for suppressing the low-frequency noise.

In the patent application JP 2005036749 A, both the claims and in the description refer to the low-frequency noise. This invention does not comprise any relation to the method for the prevention or elimination of infrasound. The method is offered to reduce the action of low-frequency noise on a specific area by the rotation of the noise exposure vector or by reducing the wind turbine rotation speed or its operating hours.

There are the two different notations of «infrasound» and the low-frequency noise.

Presently, the generation of infrasound by all wind turbines is a serious environmental problem.

Patent RU 2463475 C2 10 Oct. 2012 represents the wind power plant comprising the wind turbine placed on a tower, the two coaxial multi-blade propellers with a horizontal axis and a rotary body, an electric generator and a step-up gear. The step-up gear is connected to the shaft of the electric generator and the propellers shaft. The propellers control system controls the installation angles of the blades. The propellers are mounted at the same side of the rotational axis on their coaxial shafts and they are provided with the number of blades selected on the condition $z_1 \cdot z_2 \leq f/\omega_c$, where $z_1$ and $z_2$ are the number of blades if the first and the second propeller, respectively; f is a safe infrasound frequency which is at least 10 Hz; $\omega_c = \omega_1 + \omega_2$ is the relative rotation speed of the wind turbine, and $\omega_1$ and $\omega_2$—the frequency of rotation of the first and second propeller, rps.

The disadvantages of this system are as follows. The formula for the optimization of the number of blades which is aimed to avoid the emergence of infrasound does not account for the possibility of acoustic beat in the infrasound frequency range. Acoustic beat can occur due to the coincidence of the phase position of two or more blades.

The conventional wind power plants from which the generated electricity is transmitted to an electrical network implement usually the alternate current three-phase current generators. Their diversity is reduced to two types, namely, the synchronous generators and asynchronous generators. In both cases, as a rule, the mechanical step-up gear should be installed between the wind turbine and the electric generator. Qualitative characteristics of generated electric current and optimum use of wind power requires a constancy of the power generator rotor speed. Constant speed is easily established if the wind speed is either nominal or above nominal. This occurs due to the automatic positioning of the turbine blades. If the wind speed is reduced to 10 m/s and below, maintaining a constant the number of revolutions of the generator shaft becomes a problem. The wind turbines usually have an additional complex electronic equipment in the form of a frequency converter, its output is very consistent with the frequency harmonic of the electric power network.

The double-rotor installations the planetary gears are mostly used as step-up gears, which are installed in the wind, turbine transmission between the propellers and the electric generators. Planetary transmission having three movable shaft are commonly referred to as the differentials.

All existing differentials obey one and the same general rule. At a constant rotation speed of one certain shaft the rotating speeds of all other shafts depend on the torque applied to each such shaft. If the number of revolutions of the shaft increases, the rotation speed of other shaft is reduced, and vice versa. Let us consider the use of such a differential in the counter-rotating wind turbine. The reducing the wind speed causes the lower wind energy imposed on the turbine blades. The speed of turbine rotors begins to decline. The blade angle automatic control installation slows down the speed reduction, but it cannot restore this speed to its to initial value.

Figure 2:
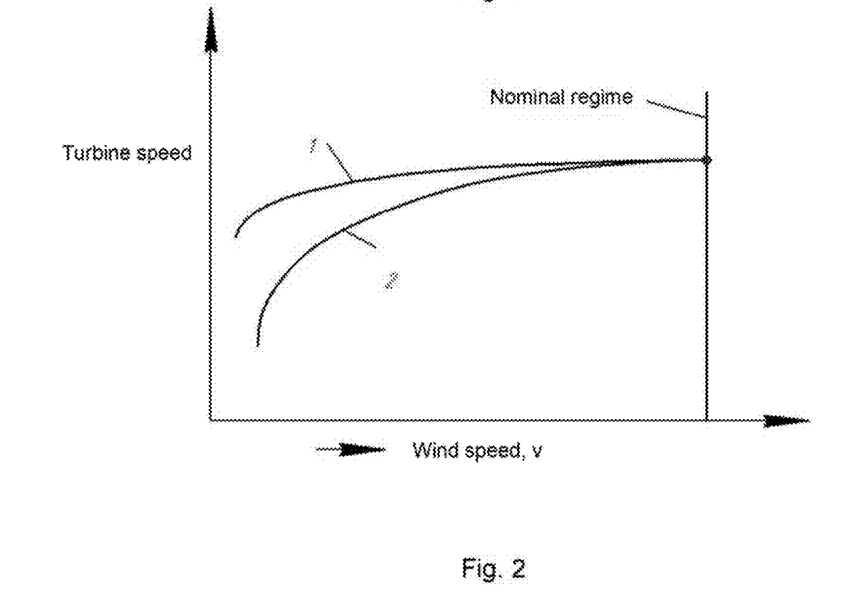
FIG. 2 shows decrease of the turbine speed with a decrease of the wind speed.
Figure 3:
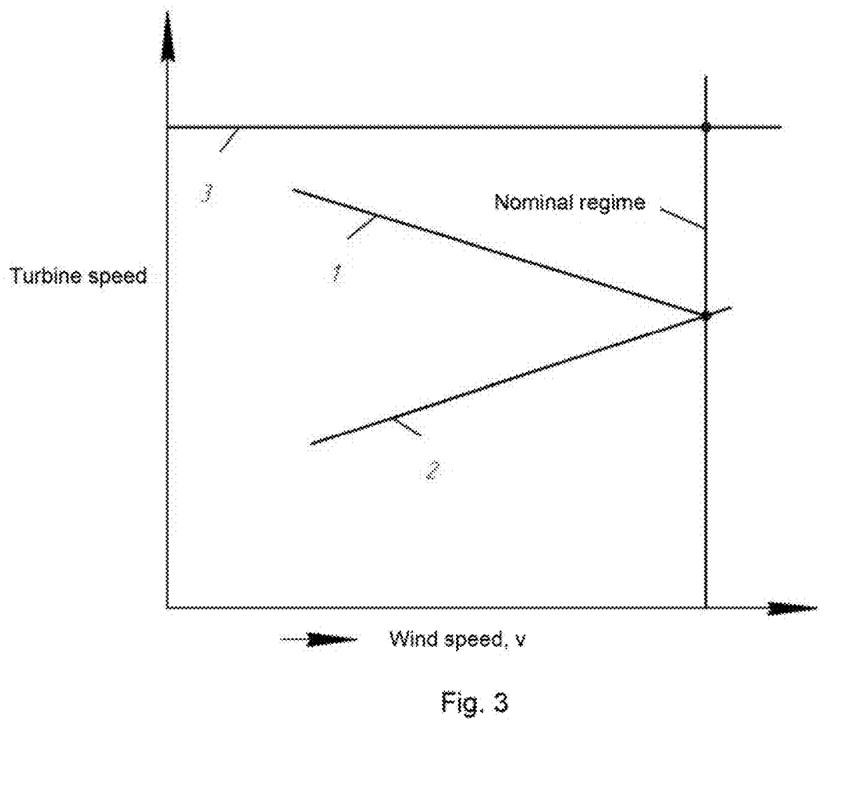
FIG. 3 shows variation of the speed of a special three-shaft planetary mechanism (the differential).

These processes are shown for convenience in FIGS. 2 and 3.

FIG. 2 shows decrease of the turbine speed with a decrease of the wind speed.

FIG. 3 shows variation of the speed of a special three-shaft planetary mechanism (the differential).

With the decrease of wind speed causes the turbine speed decreases, the speed of the second rotor 2 decreased less intensively than that of the first rotor 1 (which is explained by FIG. 2). When the speed of any rotor, for example, the first rotor 1 falls, than in order to maintain the generator speed at the nominal constant level it is necessary to increase the speed of the second shaft 2 (which is explained by FIG. 3). But this is impossible, since the energy of the air flow with the decreasing wind speed is also reduced.

If the rotor speed of the generator decreases according to the decreasing wind speed, the generator automatically switches to an electric motor mode powered from the central power supply network. Generation of electricity is stopped. This usually occurs at wind speeds lower than 20-25% of the nominal value.

The device is necessary that would support the momentum of the generator at the lowest possible wind speeds, which would provide a high power output.

The wind turbine is known under the patent application FR 2589201A1 30 Apr. 1987. The wind turbine with two rows of counter-rotating rotors, where the claim 1 comprises:
1) a supporting tower;
2) two freely rotating rotors with blades and their position control mechanism;
3) the propeller control unit which utilizes the wind energy for the rotation of the blades.

Claim 2 of the same patent comprising the wind turbine according to claim 1, where the propeller control unit utilizes a pair of ball screw pair.

Claim 3 of the same patent comprising the wind turbine according to claims 1 and 2, with the mechanisms which convert the longitudinal movement of the propeller control unit into circular motion of the blade pins.

Claim 4 of the same patent according claims 1, 2, 3 where the upper (front) rotor rotates freely relative to the lower (rear) rotor, while the lower rotor is freely rotatable relative to the output shaft.

However, this structure does not correspond to the above statement. Upper and lower rotors are linked with gear-coupling with fixed axes. Therefore, the rotors cannot rotate freely at all. The torque from the upper rotor is applied with the gear transmission to the lower rotor, and only after that it is applied with the gear transmission to the output shaft.

Such kinematics has only one degree of freedom and therefore, the functional twin-rotor system turns into a single-rotor one with the dependent constrained rotors rotating in opposite directions. A stop of any element stops the entire system. Thus it is physically impossible to maintain a constant rotor speed using the positioning of the blades when the wind speed changes.

In the patent application FR2589201A1, in claim 5, the gear drive according to claim 4 is disclosed between the upper and the lower rotors and the output shaft.

The description contains certain phrases, e.g., « . . . it contributes to maintaining the rotation speed of the rotors irrespective of changes of the wind speed»; «nearly constant rotor speed»; «This is facilitated by the rotation of the blades around their axes», etc. Such statements are the result of the general discussion. The proposed design scheme of the transmission from turbine rotor to the shaft can not provide the constant output shaft speed.

Wind turbine under the patent US 2006/0093482 A1 4 May 2006 is known. This twin-rotor turbine has coaxial rotors. The set includes a planetary type step-up gear and a special braking mechanism for the entire system.

The turbine utilizes a simple planetary satellite gear. Reducing the wind speed below the nominal, to approximately 20%, the rotation speed of all rotors is also reduced. Accordingly, the rotation speed of the generator is also reduced with all adverse effects.

The patent application JP 2007321659 A 13 Dec. 2007 describes the double-rotor installation in which the coaxial 3-blade rotors rotate in the same direction. Actually there is only one rotor in which the turbine wheel is turned relative to the other wheel to a certain angle depending on the wind speed. It is assumed that this method can achieve higher efficiency of wind energy. The mechanism is disclosed for turning one rotor to a certain angle relative to the other wheel.

However, the double-rotor turbine comprises a serious structural problem, namely, the inner shaft is thinner than the outer shaft. To prevent the physical contact of the rotors when the nacelle turns around its axis and the tower, the inner shaft should be extended. It results in the increased distance between the rotors. The deflection of the shaft increases, its strength decreases.

The layout of the existing wind turbine installations is mostly the same. The power generator is installed in the nacelle. The nacelle rotates on the axis of the tower depending on the wind direction. From the generator the cable is passed down along the fixed tower. When the nacelle rotates the cable is twisted. It is necessary either to do any automation for cable counter-twisting with the rotation of the nacelle or install special current collectors in the cable cut. In any case, it is a problem that reduces the reliability of the system, which increases the cost of installation and its maintenance.

A brief review of the existing wind turbines shows the following disadvantages:
  a) low efficiency of the use of the wind (airflow) energy in comparison with gas or hydro turbines;
  b) generation of infrasound, of a low frequency sound in the range 0-12 Hz;
  c) failure to maintain the constancy of the electric generator rotor speed at lower wind speeds below 20% of its nominal speed. This is usually below 8 m/s:
  d) twisting of the main power cable by the nacelle rotating on the stationary tower.

The technical result is the better use of wind enemy, the increase in electricity generation, shorter maintenance intervals, versatility of manufacture and operation, increased reliability and service life.

SUMMARY

The technical result is achieved by using each of double-rotor wind turbines.

Figure 4:
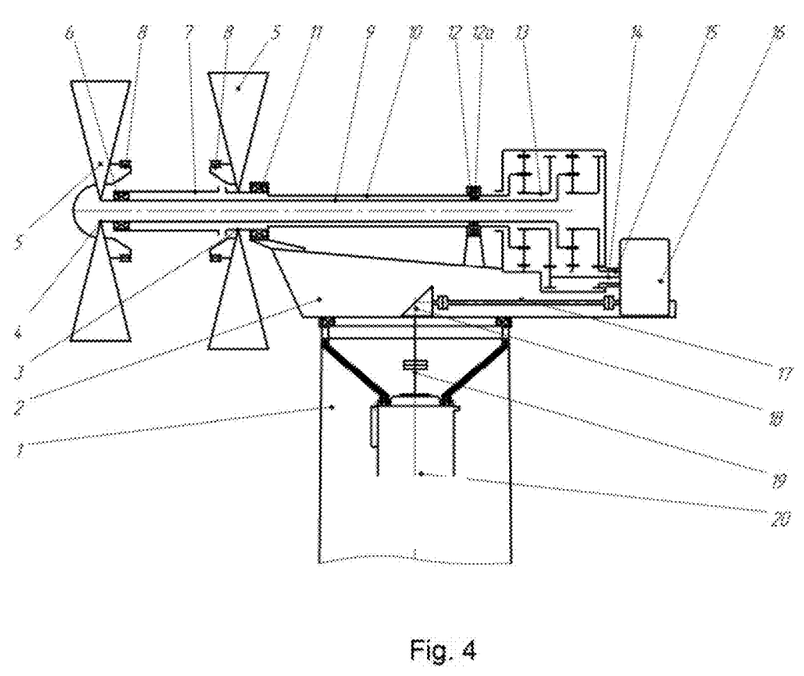
FIGS. 4 and 5 show the embodiments of double-rotor electric power installations which offers new solutions different from the conventional ones.
Figure 5:
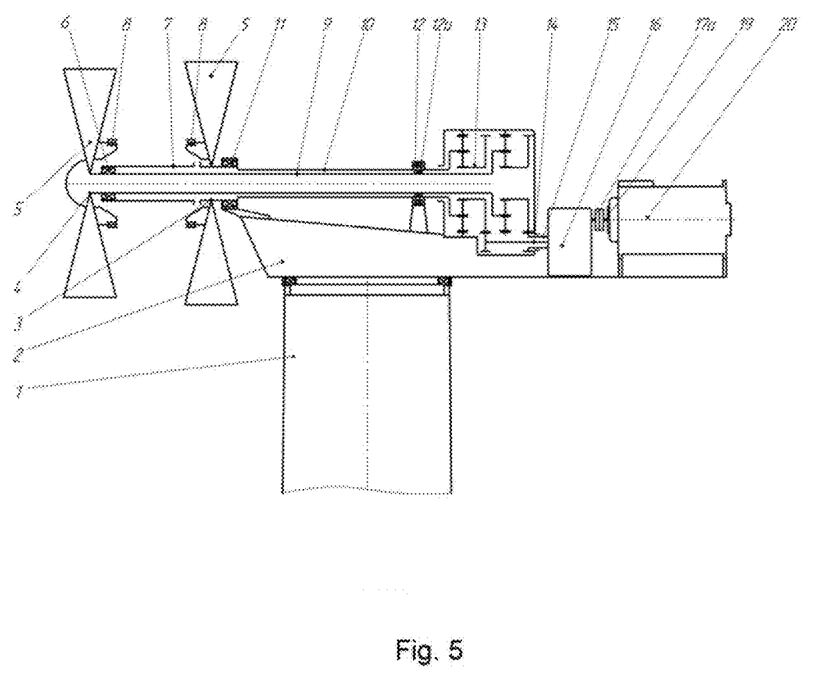

FIGS. 4 and 5 show the embodiment of double-rotor electric power installations which offers new solutions different from the conventional ones.

The wind turbine comprises a tower 1, the beating on which the which turntable 2 is installed. On the turntable there are two coaxial rotor wind turbines, mechanical gear step-up gear, three-shaft step-up gear and the generator on a separate platform or fixed to the top of the tower.

Each turbine rotor consists of a shaft 9, 10, on one end of which the propeller hub 3 is fixed with blades 4 and 5 and the systems for the positioning (axial rotation) of the blades 8, the other end of the shaft is connected to the input shaft of the step-up gear 13. The rotors are mounted on the bearings 6, 11, 12. The front internal shaft bearing 6 is located in a special spacer 7 which is connected to the second flange of the propeller hub, which is one of the distinctive features of the structure. To maximize the energy of the wind the blades of the first rotor are automatically positioned by the commands of an angle setting control system, these commands correspond to the wind speed at any given moment. The blades of the second propeller are positioned, i.e., they are set to the angle which keeps constant the power generator rotation speed. Each turbine speed decreases with the decreasing wind speed, and increases with the increasing wind speed. This speed change algorithm is set with the three-shaft gear 16, which kinematic scheme is designed as a «negative» differential unit.

The movement and the torque from the wind turbine are applied with the step-up gear 17 via two coaxial rollers 14 and 15 to two input shafts of the three-shaft gear 16 and then through the combination of the transmission shaft 17 (FIG. 4), the angular gear 18 and coupler 19 the rotation speed and torque are transferred to the electric power generator 20.

The power generator 20 in the embodiment of double rotor electric power installation (FIG. 4) is mounted on the top of the tower. The stator of the electric generator is wixed with the bracings to the walls of the tower.

An electric drive in the double-rotor embodiment, when it is placed on the turntable (see FIG. 5) is taken from the output shaft of the three-shaft gear 16. The power generator is placed horizontally, it rotates together with the turntable.

Figure 6:
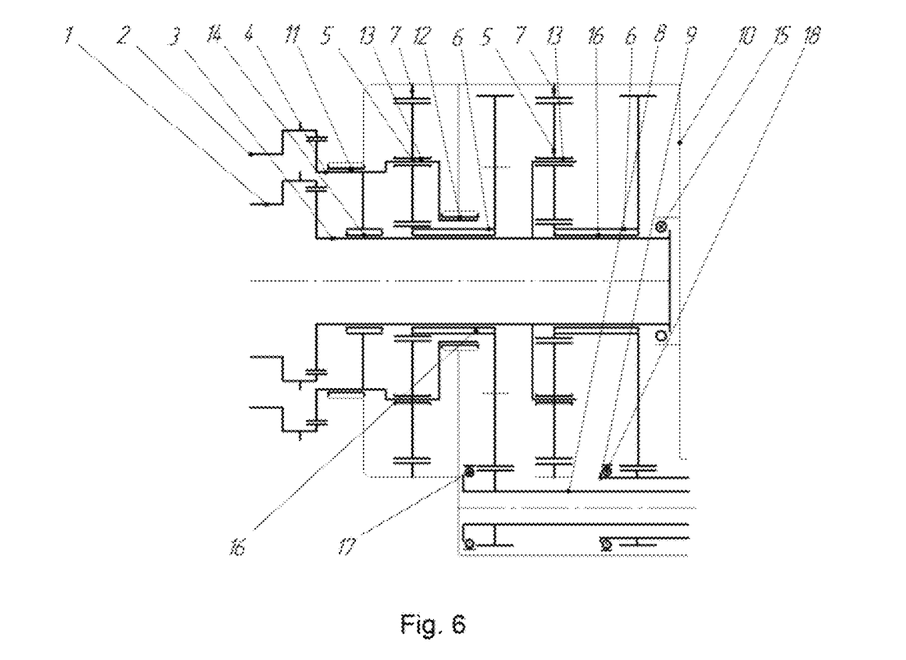
FIG. 6 shows the step-up gear circuit.

The step-up gear is a gear mechanism which kinematic scheme provides an independent power transmission and motion of each turbine to the summing three-shaft gearbox. The step-up gear circuit is shown in FIG. 6. This is the novel dual mechanism comprising the double-rotor wind turbines.

The low-speed shafts 3, 4 of the step-up gear (FIG. 6) are connected to the propellers shafts through the gear couplings 1, 2 placed one inside the other, compensating for the small size of the displacement of the axes of shafts thus being capable to transmit high torques within the relatively small dimensions. Compensation of shaft misalignment is achieved by tilting gear sleeve with respect to the gear cage due to backlash and the outer spherical surface of the teeth. The step-up gear increases the speed of the slow-moving internal and external propellers starting from 30 rpm (operation speed) to the generator operating rotation speed.

The step-up gear is combined with the cylinder-shaped housing 10 of which houses the bearing supports and the units 16, 17, 18 of the internal and external driver shafts transmitting, the torque from the propellers through the planetary gear system and sprocket transmission to the generator shaft. Structurally the sprocket transmission and the planetary gear of the internal shaft resemble the step-up planetary gear of the external shaft both of them have the same dimensions. In the planetary gear heavy loads are applied to several satellites 5 simultaneously, therefore, the size of the gears, and the size or the step-up gear housing have optimum dimensions.

Supporting hearings 11, 12 of the external driving shaft are located in the left half of the step-up gear casing. The left bearing assembly of the internal driving shaft 14 is embedded in the inner wall of the outer driving shaft, whereas the right bearing assembly 15 is located in the right half of the step-up gear casing, respectively. The central sprocket wheel with inner teeth 7 of the epicyclic outer shaft is fixed securely in the left half of the step-up gear 5, the satellites are fixed to the bearing supports 13 in the bores of the outer shaft, the guide they engage the sprocket teeth of the central large wheel with the internal teeth and the particular small-size double-crowned wheel 6 with external teeth. The torque is transmitted through the second crown gear to the input shaft of the internal sprocket three-shaft step-up gear. The driver is a combined structure formed integrally with the shaft and comprises one of the main links of the planetary transmission in which the axes of the satellites are fixed. The high precision of coordination of the boles for the installation of satellites axes in the cage determines the distribution of the load among the satellites, the bearing capacity of the step-up gear, the noise level and vibrations.

Central wheel with inner teeth 7 of the planetary gear of the inner shaft is fixed securely in the right half of the step-up gear casing, the satellites 5 are fixed on the supporting bearings 13 in the bores of the inner shaft within the driver guide and their teeth provide a coupling with the central large wheel and the internal teeth and with the external teeth of the central small double-crown wheel 6. The torque is transmitted through the second crown gear to the input shaft of the external three-shaft step-up gear.

The step-up gear is provided with a self-lubrication system comprising the oil cooler, oil pump and related units.

If the generator 20 in FIG. 4 is placed at the top of the tower then the generator rotor axis coincides with the central axis of the tower. The three-shaft gearbox output shaft transmits power to the shaft of the generator 19 through the intermediate transmission shaft 17, bevel gear 18 and be rotating clutch.

DETAILED DESCRIPTION OF THE PREFERRED EMBODIMENTS

Here the authors specify the basic design solutions of the novel double-rotor wind power installation.

1. The turbine blades comprise the rotating airfoil. The blade shell forming the aerodynamic surface is made of carbon-carbon composite material. The design is similar to an airplane wing: the spar, fibs, sheathing. The authors consider this blade stricture as novel. But the main thing is totally novel method for the calculation and design of the turbine. FIG. 1 shows the theoretical flow diagrams of the wind energy coefficients. Conventional curve is the A. Betz diagram. Maximum utilization of wind energy by Betz diagram is 0.5926, here the air passage cross-section area of the wind turbine to the flow is about 67% of the swept surface area. In the existing wind turbine the air passage cross-section area is 92-94%. About 60% of the air flow passes the turbine blades and the energy of this part of the wind is not utilized with the turbine. The novel wind turbine which is offered here is based on the use of E. Tikhonova's diagram shown in FIG. 1 (see Example 1). E. Tikhonova's diagram (or Tikhonova curve) is based on the assumption that the action of the air flow on the turbine leads to the effect of air ejection, for air which passes through the turbine drive, this effect is caused by air streams flowing around the turbine disk. As a result, the air pressure downstream of the turbine is reduced and the turbine output power increases.

The share of the passage cross-sectional area of 0.55 is accepted. Based on the value of a passage cross-sectional area the optimum number of blades their aerodynamic profile and geometry can be calculated.

Using this wind turbines design method the authors built model air turbines and studied their characteristics. Test results confirmed the high efficiency of these turbines, (See Example 2).

Figure 7:
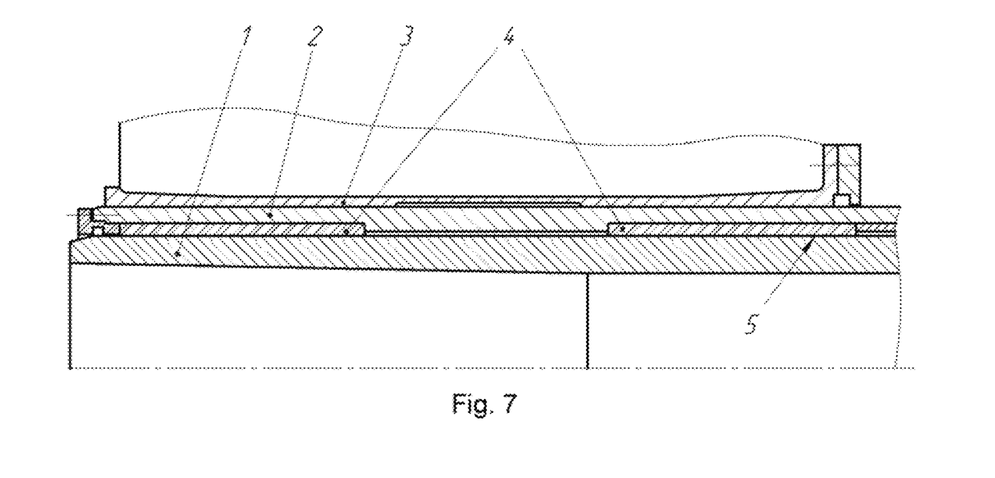
FIG. 7 shows the blade bearing unit.

2. Structural diagram in FIG. 7 shows the blade bearing unit.

The shank end of the blade 1 is mounted in the sleeve 2 of the propeller hub 3. Inside the sleeve two sliding bearing are placed consisting of ceramic sleeves 4 and the friction surface on the shank end of the blade.

In the rotary sliding bearing of the wind turbine blade 5 solid lubricant is used which is based on metal dichalcogenides in combination with a ceramic sleeve. In conventional designs greases or liquid lubricants are used. Both require periodic changing which complicates maintenance and increases maintenance costs. There are also the problems with leaking lubricant. The use of sliding bearings with solid lubricant eliminates a lot of problems in the operation: there is no need to supply lubrication system for liquid oils or greases, no periodic maintenance, no frequent replacement of lubricants.

3. Electric power generator is mounted in the tower but not on a turntable, as m the conventional wind turbines, the variant of the generator mounting is shown in FIG. 4.

The power generator is attached to the tower structure, its rotor axis coincides with the axis of rotation of the turntable support bearing. Power cables running from the generator are laid out vertically on the inner surface of the tower. The reliability of the cables is ensured whereas the cables are not twisted when the platform is rotated to any angle.

4. The rotor electric drive (see FIG. 4) is provided from the step-up gear through a bevel gear, the rotor axis coincides with the turntable bearing axis. The bevel gear casing is fixed to the turntable they both rotate when wind vector is changing. An electric clutch is installed between the output shaft of the bevel gear and the electric generator shaft to compensate some shaft misalignment. The bevel gear input shaft is connected to the a step-up gear with a transmission shaft.

5. The step-up gear is a dual gear mechanism. Its both circuits function independently. The torque of the second rotor of the turbine is applied to the first circuit, the torque from the first rotor is applied to the second circuit.

The transmission is achieved by coaxial shafts up to the entrance of the three-shaft gearbox. Each circuit consists of a planetary mechanism with the inhibited crown gear wheel satellite and two sprocket wheels, with fixed axes. His structure has never been found or used before in the construction of wind power plants.

6. In this novel power installation there is a device which provides the most important function of the wind turbines. This three-shaft gear (see Pos. 16 in FIG. 4). It is designed to maintain a constant speed of the output shaft when changing the speed of two coaxial input shafts. The gearbox is a sprocket gear mechanism. One embodiment of this mechanism shown in FIG. 8 (the 3-shaft differential gear kinematics).

Figure 8:
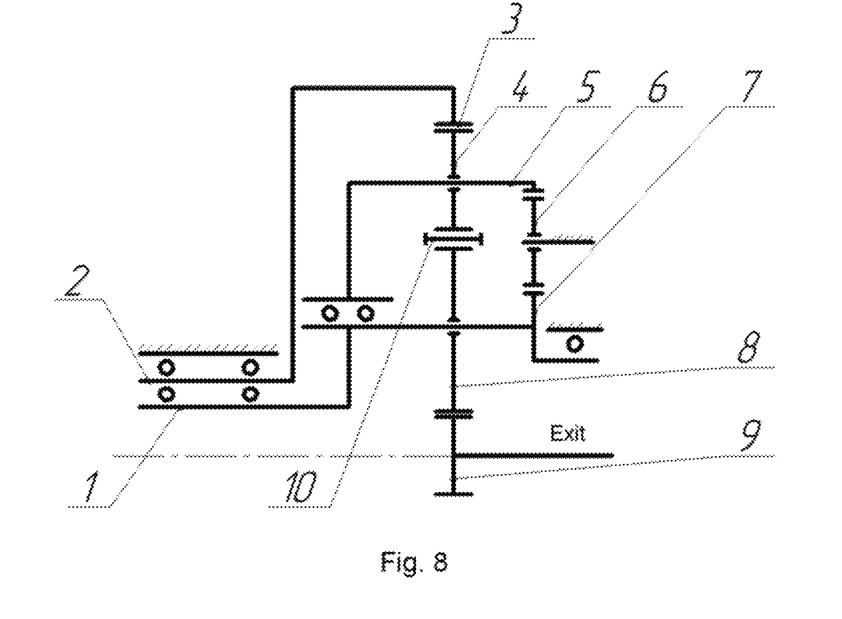
FIG. 8 shows the differential movement of units in the present invention.

This planetary gear mechanism comprises two drives 5 and 7. In the cage 5 the intermediate crown gear is secured. The driver 7 is rigidly connected to the inner input shaft 1 and the wheel 7 having the external crown gear 10. Satellites 8 are placed on the planetary driver 7. Between satellites 3 and 8 the intermediate gear rim 10 is mounted with inner and external sprocket teeth. Gear 6 with a fixed axis is used to change the direction of driver 5 rotation with respect to the driver 7. The external input shaft 2 is coaxial with the shaft 1 it has a crown 3 with internal toothing. The output central sprocket wheel 9 is engaged with satellites 8.

In fact, this mechanism is a differential.

The movement of a conventional differential links can be expressed mathematically as:

$$\omega_3 = A\omega_1 + B\omega_2, \quad\quad 1)$$

where

A and B—constant coefficients depending on the mechanism's kinematic scheme;

$\omega_1$—angular rotation speed of the input shaft;

$\omega_2$—angular rotation speed of the other input shaft:

$\omega_3$—angular rotation speed of the output shaft;

If the speed of one of the mechanism links, such as $\omega_2$ increases at a constant speed, than at $\omega_3$ remaining constant the $\omega_1$ rotation speed decreases. When the $\omega_2$ goes down the $\omega_1$ speed increases. We assume that this differential is «positive».

If $\omega_3$ speed remains constant, than changing either $\omega_3$ or $\omega_2$ rotation speed, the differential movement expression shall be expressed as:

$$\Delta\omega_1 + K\Delta\omega_2 = 0, \quad\quad 1)$$

where

K—the constant coefficient which depends on the kinematic scheme of the mechanism;

$\Delta\omega_1$ and $\Delta\omega_2$—variation of angular rotation speed;

In the proposed novel wind power installation the differential movement of units is totally different (see FIG. 8.):

$$\omega_3 = A\omega_1 - B\omega_2, \quad\quad a)$$

or when $\Delta\omega_3 32\ 0$ $$\Delta\omega_1 = K\Delta\omega_2 \quad\quad b)$$

If the speed of one shaft increases, it increases the speed of the other shaft. If the speed of the shaft is reduced, the speed of the other shaft is also reduced. This is a «negative» differentiation.

The scheme of the proposed mechanism and the differentiation method are novel. No analogs are known. With such a mechanism one of their main tasks in wind power is achieved—to maintain constant rotation speed of the electric generator with the decreasing wind speed. No additional devices such as shift boxes, electronic frequency inverters shall be required. The sine form of electric current is preserved without frequency noise.

7. To eliminate the occurrence of dangerous infrasound frequencies in the range of 0-12 Hz the number of blades in each rotor shall be selected on the condition that the number of the first rotor blades is z, and the number of the other rotor blades is (z+1).

8. An external rotor shaft 10 (see FIG. 5) is mounted on two ball bearings 11 and 12 that are placed in the rotary engine mounting platform 2. The inner shaft 9 is also mounted on two hearings 6 and 12a. The inner shaft protrudes to 2.5-3 m from the end of sleeve 3 of the external rotor. Console extension of the inner shaft may reach significant values when the mass of the front hub with blades is 6-7 ton. In order to improve the strength characteristics of the inner shaft the external shaft is lengthened artificially by placing a cylindrical spacer 7, which is attached to the flange of the second hub with bolts. At the end of the spacers the rotary bearing 6 is fixed, With its inside diameter it is coincided and mounted on the sleeve 4. Bearing 6 becomes the support of the inner front shaft. Inner shaft console length is therefore reduced to to 0.5 m instead of 3 m. The inner shaft 9 becomes more rigid and durable with its spacer 7.

9. The proposed double-rotor wind power installation each rotor is independent of the other, i.e, each one can rotate independently. For optimal use of the unique properties of «negative» differential a special control system has been developed for blades angles installation using only 2 knobs. To prevent speed pulsations and rotation speed swing have different blade rotor control rules are provided for the controllers. One knob adjusts the angle of the rotor blades in their direct dependence on the wind speed, as shown in:

$$\beta_1 = f(\upsilon), \quad\quad 1)$$

where $\beta_1$—angle of the blades of one rotor;

$\upsilon$—wind speed;

The feedback signal from the encoder of the rotation angle sensor which measures the current position of the blade is fed to the wind speed measurement system.

The controller sets the other rotor angle $\beta_2$ to a value sufficient to stabilize the electric generator rotation speed, keeping it at constant level:

$$\beta_2 = f(n_2), \text{ at } n_r = \text{const}, \quad\quad 1)$$

where $\beta_2$—angle of the other rotor blades;

$n_r$—rotation speed (rpm) of the electric generator;

$n_2$—other rotor speed;

const—constant

Example 1

Figure 9:
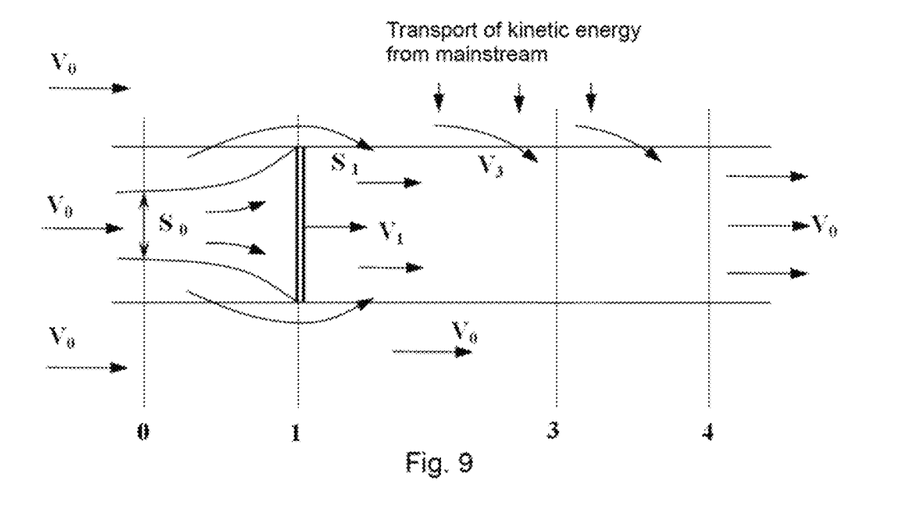
FIG. 9 shows the diagram of the energy exchange between the main flow and the turbine.

We propose a theory for calculating the WEUC (wind energy utilization factor) taking into account the ejection of turbine flow streams of the main air flow. FIG. 9 shows the aerodynamic configuration of the considered option.

We introduce an assumption that the pressure wave propagation velocity is close to the velocity of air flow, the diffusion and mass transfer processes. This assumption is quite justified in the weather conditions of the Earth's atmosphere.

The air flow runs over the turbine disk. Part of this flow with the mass $m_1$ and initial cross-sectional area $S_0$ fells on the disc and the flow velocity $V_0$ is slowing around the disc to $V_1$. The main air flow passes the active working sections of the disc with a velocity $V_0$. Turbine flow having passed through the disk is ejected into the main air stream. The turbine flow $V_1$ and $V_3$ of the mixed flow rate is less than the speed $V_0$ of the main stream.

Due to the speed difference, the velocity vector of the sum of two passing by streams shall be directed towards the flow with lower speed. The main flow will exponentially transmit us kinetic energy to the turbine as long as the turbine flow rate becomes equal to $V_0$. Therefore it is better to set the limit:

$$V_4 = KV_0 \approx 0.97 V_0$$

This process causes the vacuum on the back side of the turbine disk P1*. We assume that the efficiency of the ejector mixing jets is 1.

FIG. 9 shows the diagram of the energy exchange between the main flow and the turbine.

flow number in the cross section «4» is;

$$mV_4 = \rho S_1 V_4^2$$

flow number in the cross section of «1» is:

$$m_1 V_1 = \rho S_1 V_1^2$$

The difference in the number of movements, shall be, respectively:

$$F_{4-1} = \rho S_1 (V_4^2 - V_1^2)$$

The difference of the flows between the sections «0» and $S_1$ is:

$$F_{0-3} = m_3(V_0 - V_1) = \rho S_1 V_1 (V_0 - V_3)$$

The total force acting on the turbine disk is:

$$F_\Sigma = F_{4-1} + F_{0-1} = \rho S_1 (V_4^2 - V_1^2) + \rho S_1 V_1 (V_0 - V_1)$$

And the corresponding energy, working on the disc is:

$$\Delta W_1 = F_\Sigma * V_1$$

As a result, the formula for determining the energy efficiency coefficient of the wind is as follows:

$$\xi = \frac{\Delta W_T}{W} = 2\frac{V_1}{V_0}\left(K^2 - \frac{V_1^2}{V_0^2}\right) + 2\frac{V_1^2}{V_0^2}\left(1 - \frac{V_1}{V_0}\right) \quad (11)$$

Exploring the function to the maximum we shall obtain the maximum WEUC:

$$\xi \approx 0.999. \quad \text{a)}$$

Figure 10:
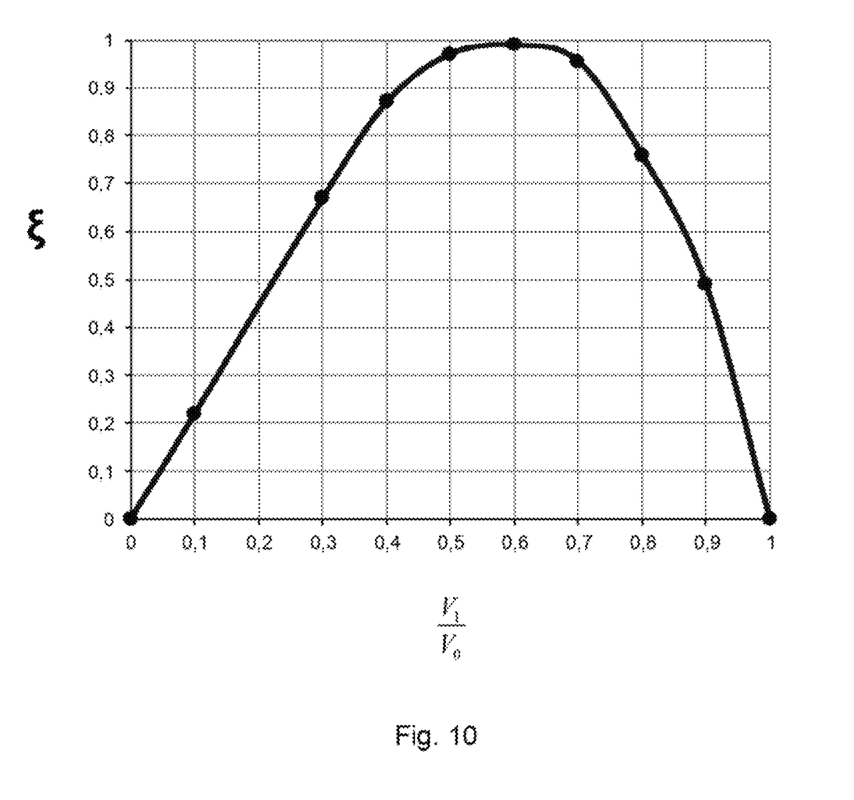
FIG. 10 shows theoretical WEUC value of the ideal wind turbine based on the ejection effect.

The curve of $$\frac{\Delta W_T}{W}$$

changes shown in FIG. 10 (theoretical WEUC value of the ideal wind turbine based on the ejection effect).

Whereas the $$\frac{V_1}{V_0} = \frac{S_0}{S_1},$$

then the optimum area of the «live» cross-section of the turbine disc should be in the range of 0.5-0.75 of the total disk area.

Example 2

The test results of the experimental wind power installation with double-rotor wind turbine.

1. The Purpose of the Test 1.1 Determination of the Power Characteristics of the Wind Turbine.

1.2 Refinement of Methods of Calculation of Large Wind Turbines.

2. Test Object 2.1 Experimental Wind Turbine Я nC-B-5 M.

Geometric and aerodynamic characteristics:

Turbine scheme: double-rotor, coaxial, with the opposite rotation of the rotors;

Rotor diameter—5 m,

Number of blades per rotor—5 pcs.

Figure 11:
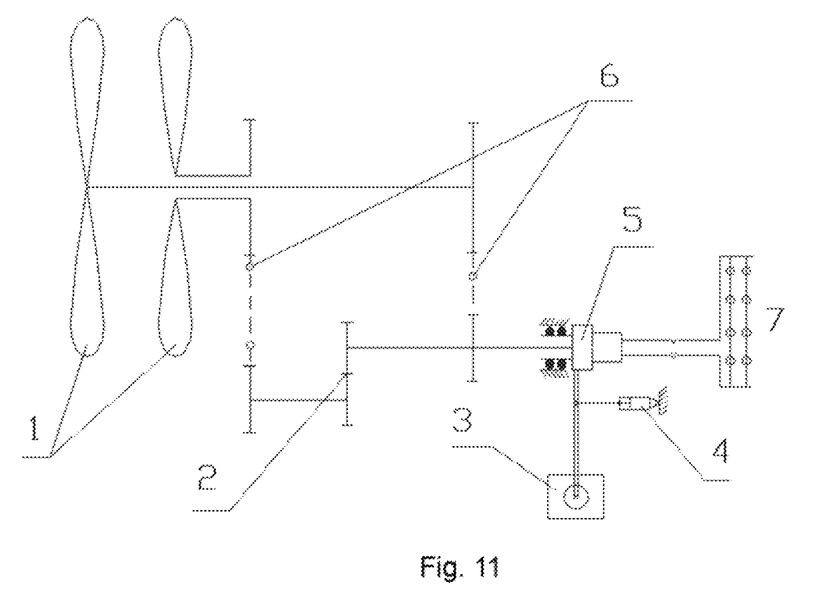
FIG. 11 shows kinematic diagram of the test stand.

Blade aerodynamic profile—GA airfoil blades (W)-2 (NASA terminology);

Blade material—multilayer aviation plywood;

Blade shape—rectangular, with constant chord;

Chord length—0.12 m;

Installation of the attack angle mechanism—rotation of die blade by hand. Fixing the blades;

2.2 Kinematic Diagram of the Test Stand is Shown in FIG. 11.

Torque from the rotors of the wind turbine system 1 through V-belt and gears 2, 6 rotates the shaft of the electric generator 5. The generator is mounted on ball bearings and is rotatable about the axis of its rotor. The torque on the stator of the generator is applied through the balancing lever to the scale 3. Damping of the system oscillations is effected with the hydraulic damper 4. Power calculation is made using the torque and the rotation speed of the generator rotor, the calculation method is described in InS-W-16/1. In addition, the power is controlled with dropping resistors 7.

3. Test Results

Tests were conducted in May and June 2008, The unit was installed on the flat roof of a 5-story building. Shading of the turbine for wind vector was not used.

Electrical connections were made in accordance with the procedure InS-W-16/1, Measurements were carried out at a steady wind conditions. The following measurements were made: the generator rotation speed, the load on the balancer lever, wind speed, temperature and barometric pressure, the date and time of measurement. All parameters were recorded in the operating log.

3.1 The measurements were made according to the procedure of procedure InS-W-16/1. The utilization of wind energy in the area swept with the wind turbine was calculated with correction for air density.

$$\xi = \frac{W_{mea} \cdot 1.23}{W \cdot \rho_{fact}}$$

Where $W_{mea}$—measured wind turbine power, W—maximum power of the wind, within the swept area; $\rho_{fact}$—measured air density at the time of power measurements.

Figure 12:
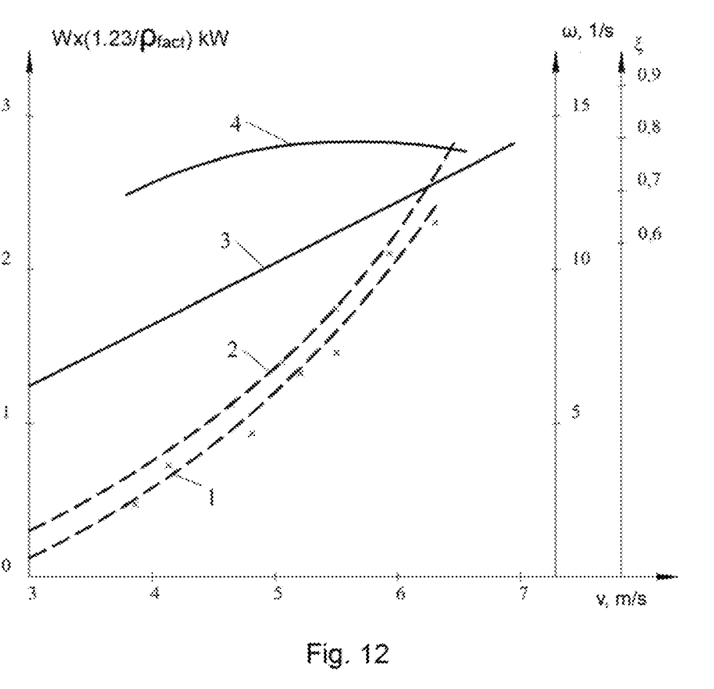
FIG. 12 and FIG. 13 show the results obtained after the processing of the measurements and related calculations of basic tests.
Figure 13:
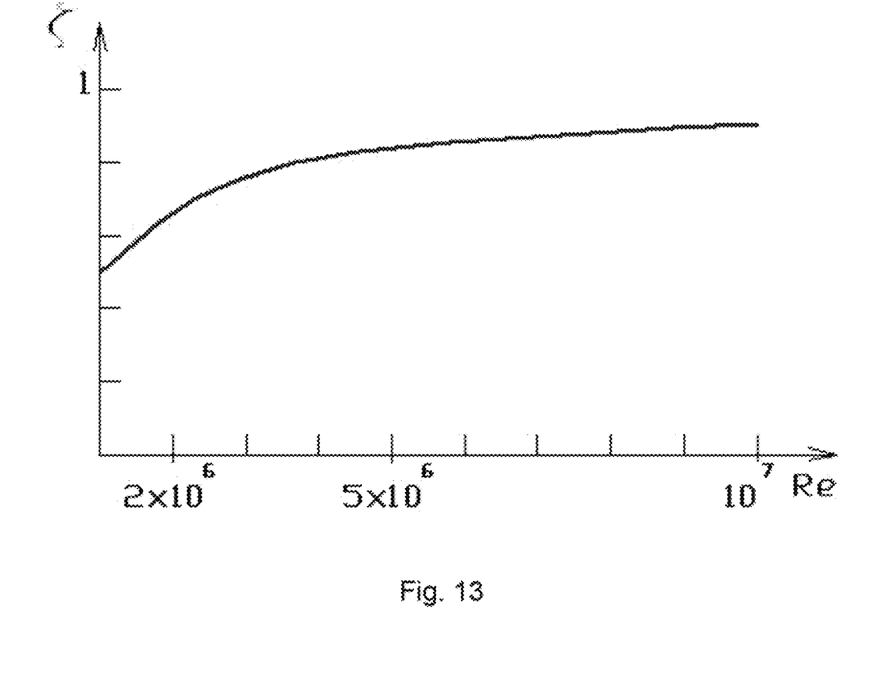

The results obtained after the processing of the measurements and related calculations of basic tests are shown in the graphs, FIG. 12 and FIG. 13.

FIG. 12 double rotor wind turbine power vs the wind speed:
The line of actual power measurements $$\xi = \frac{W_{mea} \cdot 1,23}{W \cdot \rho_{fact}}$$

Calculated power values curve
Angular rotor speed of the wind turbine
Wind energy utilization coefficient
FIG. 13 Dependence of wind energy utilization coefficient $$\xi = \frac{W_{mea} \cdot 1,23}{W \cdot \rho_{fact}}$$

on the Re number.

CONCLUSIONS

Received power values obtained during the test of the experimental double-rotor turbine with counter-rotating rotors demonstrate sufficient coincidence with the calculated power values;
according to the test results, the dependence of wind energy utilization coefficient in the form of $$\xi = \frac{W_{mea}}{W} \cdot \frac{1,23}{\rho_{fact}}$$

on the Re number (FIG. 2) was established. With an increasing Re number the wind energy utilization coefficient is increasing.
The test of the experimental wind turbine MS-W-5 it showed its high efficiency;
It is advisable to develop a number of wind turbines on the basis of double-rotor kinematic schemes. The use of a differential mechanism with a variable transmission ratio is recommended as a step-up gear;
Test results are recommend for use for the improvement of the calculation method for wind turbines.
The Example 2 is based on the test results of the experimental of the wind power plant with double-rotor wind turbines obtained by the authors.

What we claim is:

1. A double-rotor wind power plant, comprising: a wind turbine mounted on a tower with two coaxial wind propellers on a rotating platform, a transmission, systems for controlling pitch angles of blades and a position of the platform, an electric generator, wherein a generator rotor with a vertical axis of rotation is situated on a top of the tower, and a stator of this generator is fixed to the tower, and an electric generator rotor axis extends vertically and coincides with an axis of rotation of the platform.

2. A double-rotor wind power plant of claim 1, wherein a drive from the turbine to the generator is a bevel gear.

3. A double-rotor wind power plant, comprising: a wind turbine placed on a tower with two coaxial propellers on a rotating platform, a transmission, a control system for angle installation and position of blades and a platform position, an electric generator, wherein a step-up gear is a double-gear mechanism assembled in a single package, each circuit of which transmits motion and torque from one of turbine rotors independently of movement of another circuit, that a kinematic diagram of the circuit is the planetary gear and a single-step gear.

4. A double-rotor wind power plant, comprising: a wind turbine placed on a tower with two coaxial propellers on a rotating platform, a transmission, a control system for angle installation and position of blades and a platform position, an electric generator, wherein a coaxial three-shaft sprocket gear is installed between a step-up gear and a power generator rotor, that a three-shaft gear kinematic diagram is made according to a following condition $$\Delta\omega_1 = K \cdot \Delta\omega_2, \text{ where } \omega_3 = \text{const},$$

where
$\Delta\omega_1$—a change of an angular velocity of an internal input shaft;
$\Delta\omega_2$—a change of an angular velocity of an external input shaft;
K—a constant factor, which depends on a gear kinematic scheme;
$\Delta\omega_3$—a change in an angular velocity of an output shaft;
const—a constant.

5. A double-rotor wind power plant, comprising: a wind turbine placed on a tower with two coaxial propellers on a rotating platform, a transmission, a control system for angle installation and position of blades and a platform position, an electric generator, wherein a lengthening spacer is fixed on the external shaft of the turbine, at the end of which the front bearing the inner shaft is installed.

6. A double-rotor wind power plant, comprising: a wind turbine placed on a tower with two coaxial propellers on a rotating platform, a transmission, a control system for angle installation and position of blades and a platform position, an electric generator, wherein a control algorithm of rotation angles of the blades of a first rotor is $$\beta_1 = f(\upsilon), \text{ i.e.,}$$

a positioning of the blade angle depends only on a wind speed, and a control algorithm of another rotor is $n_{gen} = \text{const}$, $\beta_2 = \text{var}$ which means that a generator rotation speed is kept constant by changing angles of the other rotor blades,
where $\beta_1$—is an installation angle of the first rotor; $\upsilon$—is the wind speed; $n_{gen}$—is an electric generator rotation speed; $\beta_2$—is another angle of the rotor; var—is a variable.

* * * * *